United States Patent [19]
Chiarot et al.

[11] Patent Number: 5,860,150
[45] Date of Patent: Jan. 12, 1999

[54] INSTRUCTION PRE-FETCHING OF A CACHE LINE WITHIN A PROCESSOR

[75] Inventors: Kevin Arthur Chiarot, Pflugerville; Michael John Mayfield, Austin; Era Kasturia Nangia, Austin; Milford John Peterson, Austin, all of Tex.

[73] Assignee: International Business Machines Corporation, Armonk, N.Y.

[21] Appl. No.: 540,374

[22] Filed: Oct. 6, 1995

[51] Int. Cl.⁶ ................................................. G06F 12/00
[52] U.S. Cl. .......................................... 711/213; 395/383
[58] Field of Search .................................. 395/375, 403, 395/383; 711/3, 213, 137

[56] References Cited

U.S. PATENT DOCUMENTS

| | | | |
|---|---|---|---|
| 5,155,832 | 10/1992 | Hunt | 711/120 |
| 5,170,476 | 12/1992 | Laakso et al. | 711/140 |
| 5,276,848 | 1/1994 | Gallagher et al. | 711/121 |
| 5,361,391 | 11/1994 | Westberg | 711/137 |
| 5,386,526 | 1/1995 | Mitra et al. | 711/3 |
| 5,396,604 | 3/1995 | DeLano et al. | 395/383 |
| 5,404,484 | 4/1995 | Schlansker et al. | 711/133 |
| 5,450,564 | 9/1995 | Hassler et al. | 711/158 |
| 5,473,764 | 12/1995 | Chi | 395/383 |
| 5,499,355 | 3/1996 | Krishnamohan et al. | 711/137 |
| 5,553,255 | 9/1996 | Jain et al. | 395/582 |
| 5,553,276 | 9/1996 | Dean | 395/555 |

OTHER PUBLICATIONS

Chen, Tien–Fu and Jean–Loup Baer. Effective hardware-–based data prefetching for high–performance processors. IEEE Transactions on Computers. vol. 44. No. 5. May 1995.
U.S. Patent Application Serial No. (AA9–95–067) 08/529470.
U.S. Patent Application Serial No. (AA9–95–069) 08/531948.
U.S. Patent Application Serial No. (AA9–95–070) 08/519031.
U.S. Patent Application Serial No. (AA9–95–082) 08/518348.
U.S. Patent Application Serial No. (AA9–95–083) 08/519032.
U.S. Patent Application Serial No. (AA9–95–084) 08/518347.

Primary Examiner—Eddie P. Chan
Assistant Examiner—Kevin Verbrugge
Attorney, Agent, or Firm—Kelly K. Kordzik; Winstead Sechrest & Minick P.C.; Mark E. McBurney

[57] ABSTRACT

An apparatus for fetching data from a main memory into a primary cache memory of a processor. Instruction fetch requests are generated by the processor and assigned a priority level according to the predicted accuracy of the fetch request. The priority levels of different fetch requests are compared and the highest priority level fetch request is serviced first. An instruction cache line address N+1 is pre-fetched if there is a cache miss in the primary cache memory on address N+1.

24 Claims, 4 Drawing Sheets

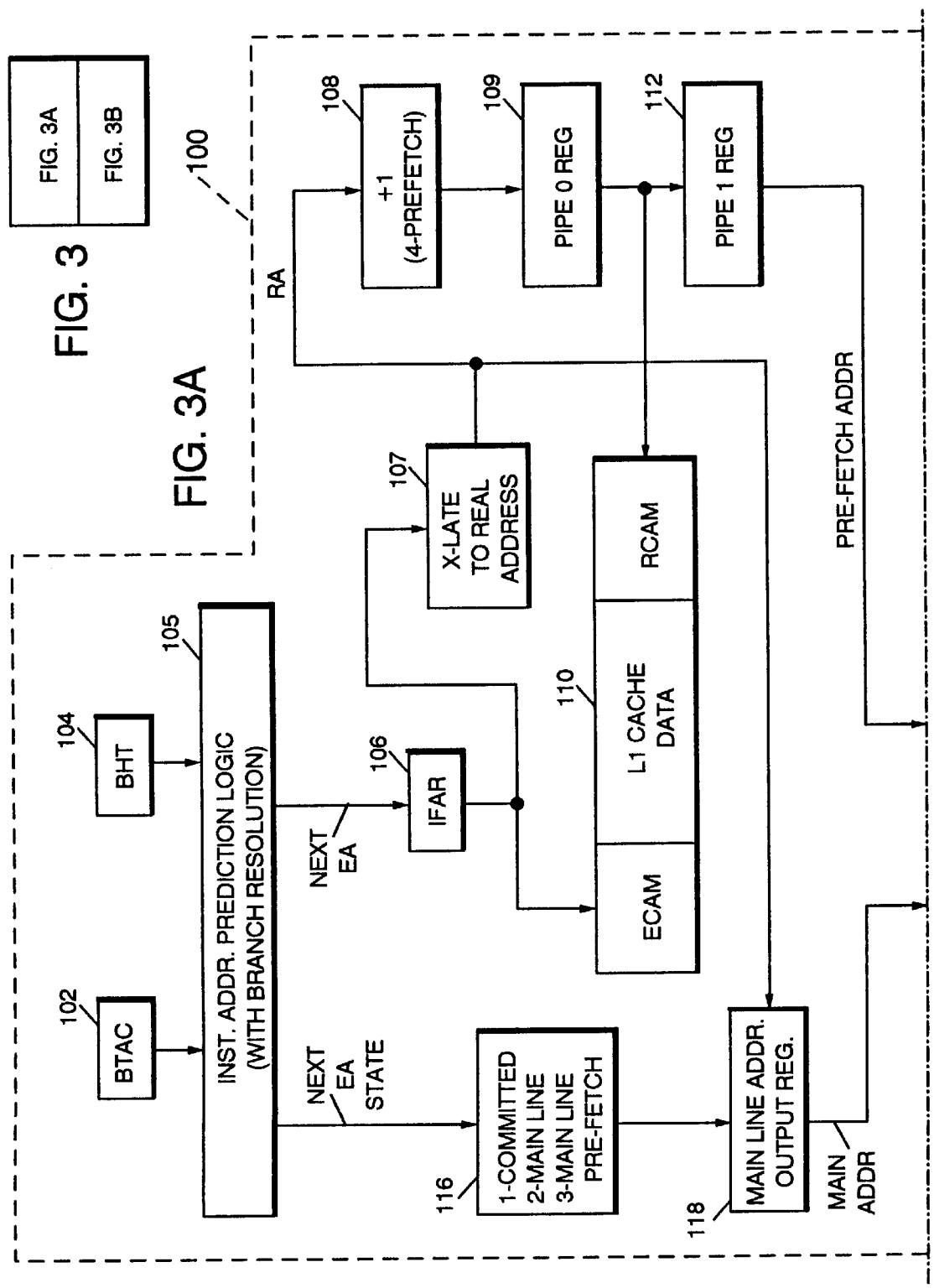

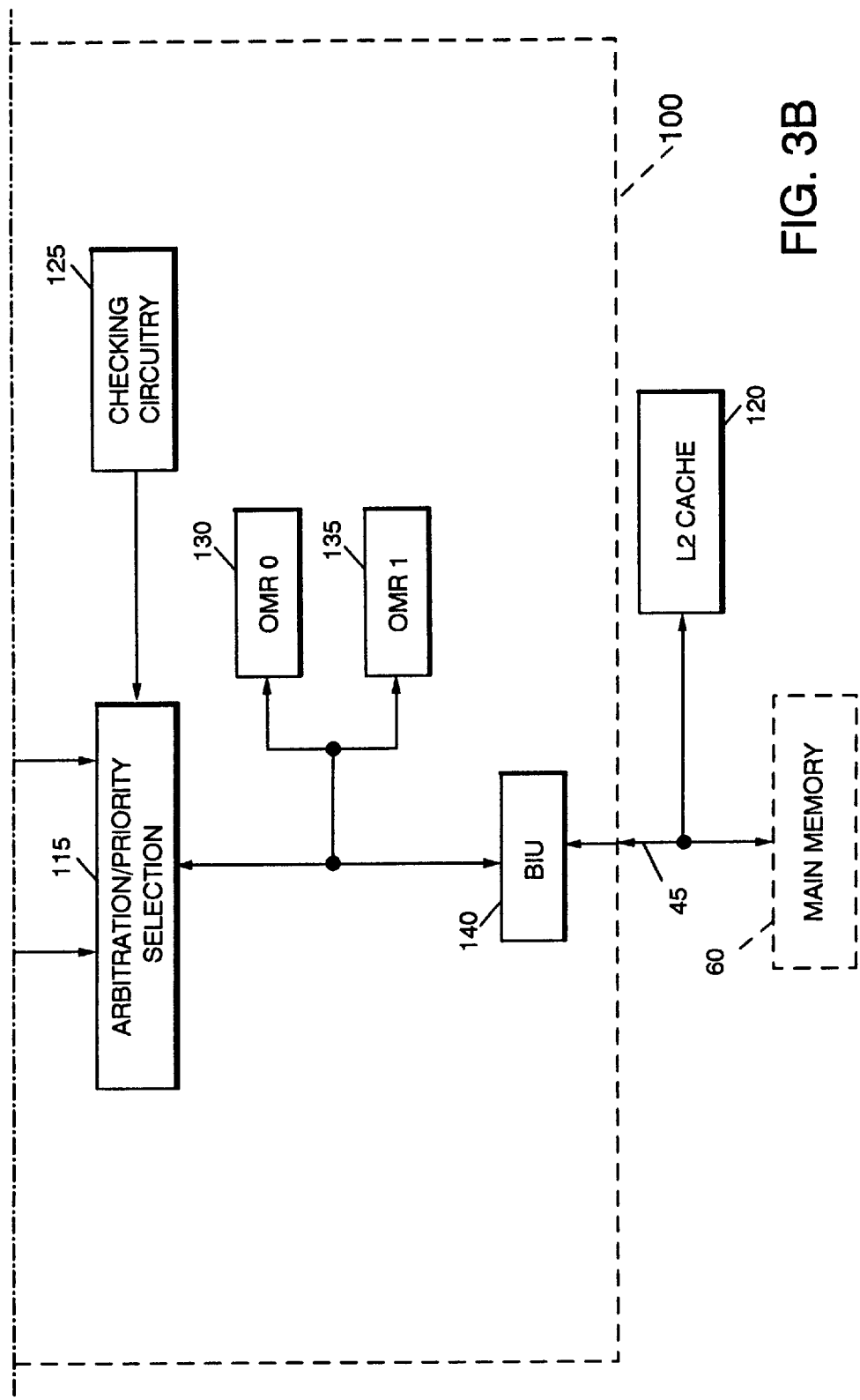

INSTRUCTION PRE-FETCHING OF A CACHE LINE WITHIN A PROCESSOR

CROSS-REFERENCE TO RELATED APPLICATIONS

This application for patent is related to the following applications for patent:

PRE-FETCHING DATA FROM MEMORY ACROSS PAGE BOUNDARIES, U.S. patent application Ser. No. 08/529,470; abandoned CACHE CONTROLLED INSTRUCTION PRE-FETCHING, U.S. Pat. No. 5,721,864;

PROGRESSIVE DATA CACHE, U.S. Pat. No. 5,664,147

MODIFIED L1/L2 CACHE INCLUSION FOR AGGRESSIVE PREFETCH, U.S. patent application Ser. No. 08/518,348, allowed STREAM FILTER, U.S. Pat. No. 5,737,565; and CACHE DIRECTORY FIELD FOR INCLUSION, U.S. patent application Ser. No. 08/518,347, allowed.

These applications for patent are hereby incorporated by reference in the present disclosure as if fully set forth herein.

TECHNICAL FIELD OF THE INVENTION

The present invention relates in general to data processing systems and, in particular, to processing systems which pre-fetch data from a main memory into one or more cache memories.

BACKGROUND OF THE INVENTION

In modern microprocessor systems, processor cycle time continues to decrease as technology continues to improve. Also, design techniques of speculative execution, deeper pipelines, more execution elements and the like, continue to improve the performance of processing systems. The improved performance puts a heavier burden on the memory interface since the processor demands data and instructions more rapidly from memory. To increase the performance of processing systems, cache memory systems are often implemented.

Processing systems employing cache memories are well known in the art. Cache memories are very high-speed memory devices that increase the speed of a data processing system by making current programs and data available to a processor ("CPU") with a minimal amount of latency. Large on-chip caches (L1 caches) are implemented to help reduce the memory latency, and they are often augmented by larger off-chip caches (L2 caches).

The primary advantage behind cache memory systems is that by keeping the most frequently accessed instructions and data in the fast cache memory, the average memory access time of the overall processing system will approach the access time of the cache. Although cache memory is only a small fraction of the size of main memory, a large fraction of memory requests are successfully found in the fast cache memory because of the "locality of reference" property of programs. This property holds that memory references during any given time interval tend to be confined to a few localized areas of memory.

The basic operation of cache memories is well-known. When the CPU needs to access memory, the cache is examined. If the word addressed by the CPU is found in the cache, it is read from the fast memory. If the word addressed by the CPU is not found in the cache, the main memory is accessed to read the word. A block of words containing the word being accessed is then transferred from main memory to cache memory. In this manner, additional data is transferred to cache (pre-fetched) so that future references to memory will likely find the required words in the fast cache memory.

The average memory access time of the computer system can be improved considerably by use of a cache. The performance of cache memory is frequently measured in terms of a quantity called "hit ratio." When the CPU accesses memory and finds the word in cache, a cache "hit" results. If the word is found not in cache memory but in main memory, a cache "miss" results. If the CPU finds the word in cache most of the time, instead of main memory, a high hit ratio results and the average access time is close to the access time of the fast cache memory.

Pre-fetching techniques are often implemented to try to supply memory data to the on-chip L1 cache ahead of time to reduce latency. Ideally, data and instructions are pre-fetched far enough in advance so that a copy of the instructions and data is always in the L1 cache when the processor needs it. Pre-fetching of instructions and/or data is well-known in the art.

However, existing pre-fetching techniques often pre-fetch instructions and/or data prematurely. Data may be pre-fetched from a speculative data path and then may never be used when the processor executes a different data path. The unused data may also displace data needed by the processor, resulting in a redundant re-fetching of the needed data. The pre-fetch memory accesses often delay subsequent processor cache reloads of needed data, thus increasing the latency of the needed data. All of these effects lower the efficiency of the CPU. These problems stem chiefly from the fact that "mainline" cache misses are treated the same as speculative pre-fetches of future instructions.

There is therefore a need for cache pre-fetching systems that can distinguish between requests for speculative instruction pre-fetches and requests for "mainline" cache misses of needed instructions and assign a higher priority to servicing the cache misses.

SUMMARY OF THE INVENTION

The limitations inherent in the prior art are overcome by a processor comprising a primary cache memory, next address circuitry for generating a next instruction address N associated with a pending line of instructions being executed by the processor, and pre-fetch address circuitry for generating a pre-fetch instruction address N+1. The processor further comprises first address request circuitry for generating a next address request and accessing the next instruction address N in the primary cache memory and second address request circuitry for generating a pre-fetch address request and accessing the pre-fetch instruction address N+1 in the primary cache memory. An arbitration circuitry is provided for receiving the next address request and the pre-fetch address request and sending the next address request to an external memory if the next address request resulted in a primary cache miss and sending the pre-fetch address request to the external memory if the next address request resulted in a primary cache hit and the pre-fetch address request resulted in a primary cache miss.

The foregoing has outlined rather broadly the features and technical advantages of the present invention in order that the detailed description of the pre-fetching circuitry that follows may be better understood. Additional features and advantages of the pre-fetching circuitry will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIGS. 3, 3A, and 3B are a block diagram of a more detailed implementation of a processing system in accordance with the present invention.

DETAILED DESCRIPTION OF THE INVENTION

Figure 1:
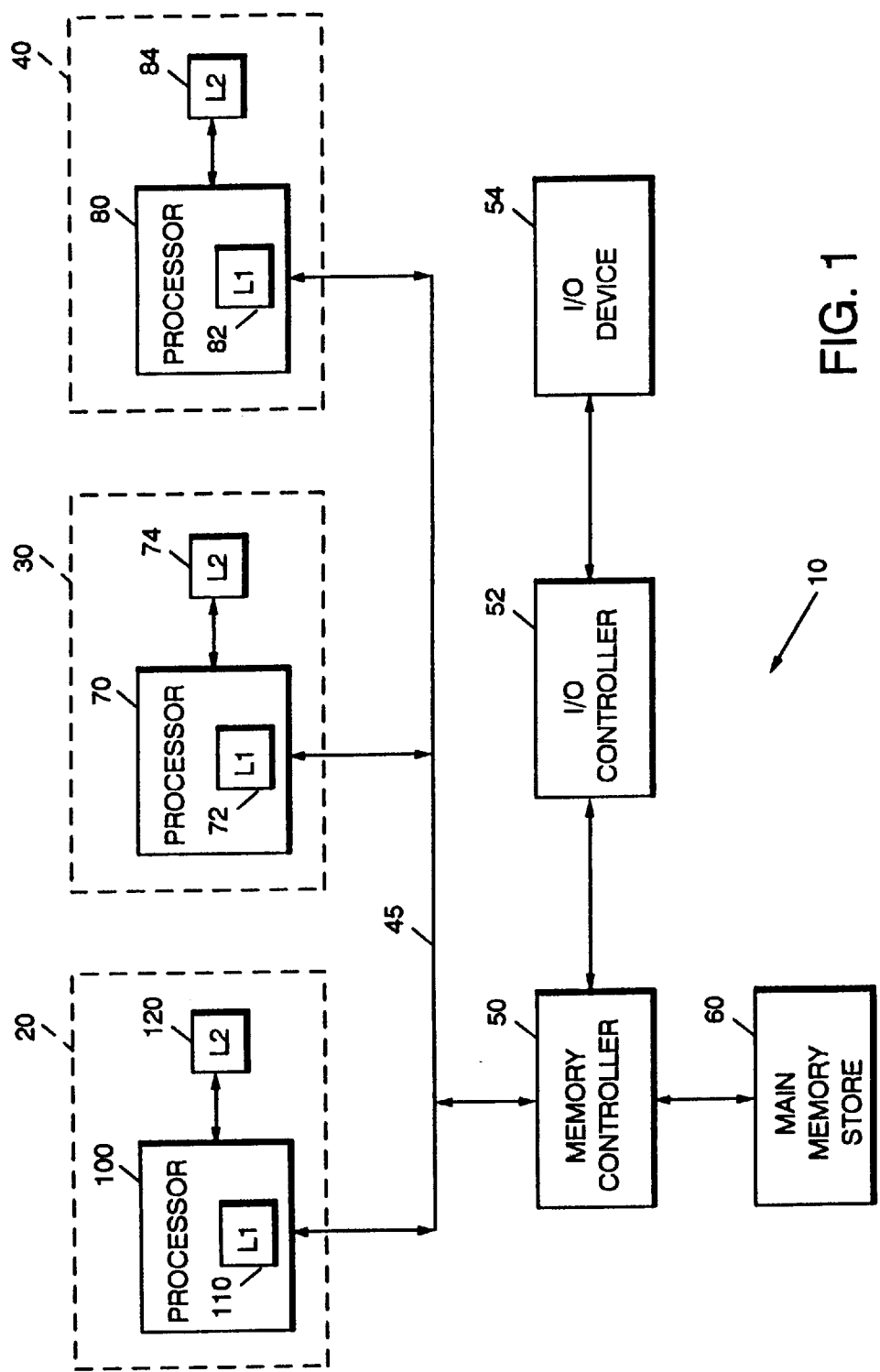
FIG. 1 is a block diagram of a multi-processor system utilizing cache pre-fetching systems in accordance with the present invention.
Figure 2:
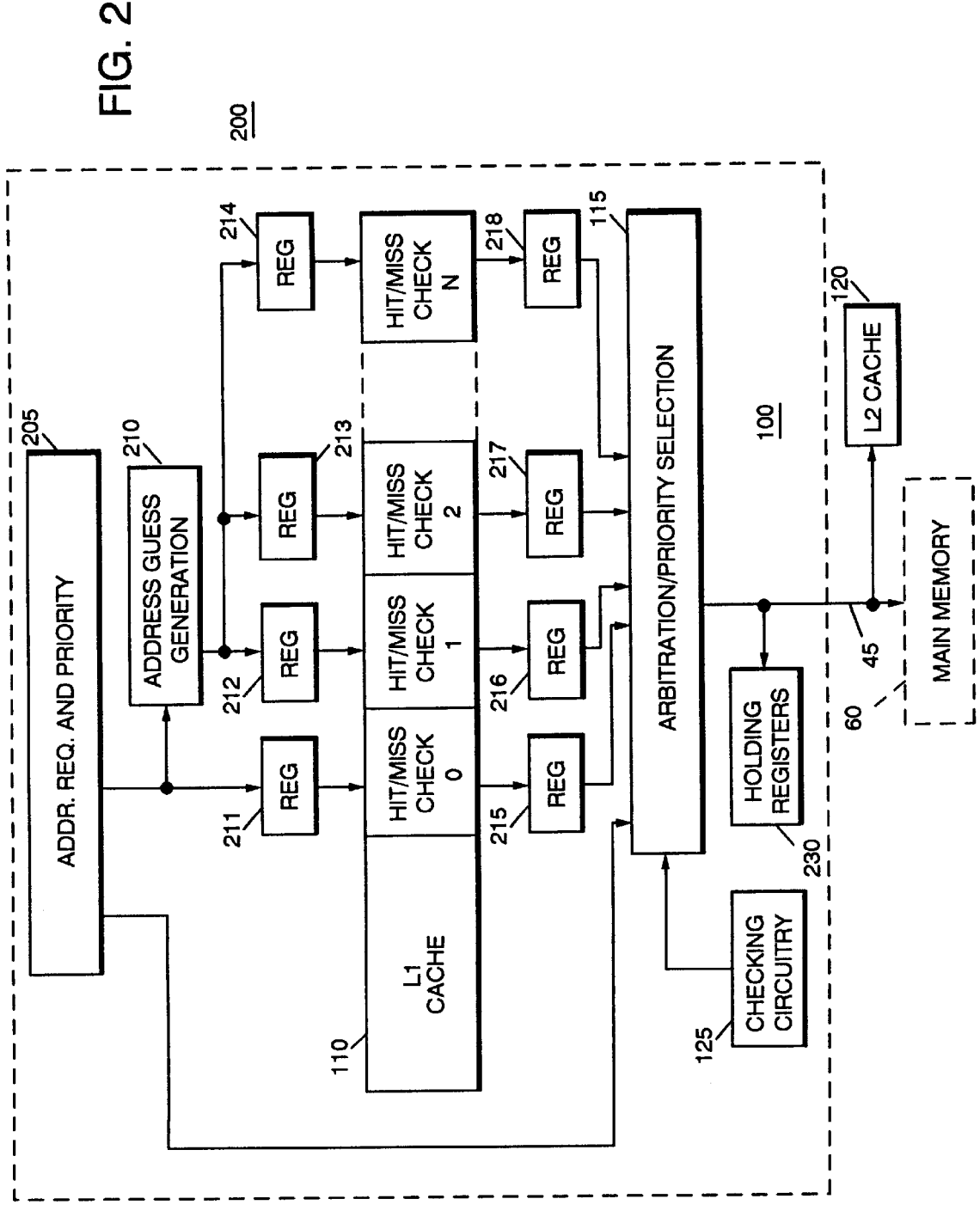
FIG. 2 is a block diagram of a generalized implementation of a processing system in accordance with the present invention.

The principles of the present invention and their advantages are best understood by referring to the illustrated embodiments depicted in FIGS. 1–3 of the drawings, in which like numbers designate like parts.

Referring now to FIG. 1, a processing system which advantageously embodies the present invention is depicted. Multi-processor system 10 includes a number of processing units 20, 30 and 40 operatively connected to system bus 45. Note that any number of processing units may be utilized within multi-processor system 10. Also connected to system bus 45 is memory controller 50, which controls access to main memory store 60. Memory controller 50 is also coupled to I/O controller 52, which is coupled to I/O device 54. Processing units 20, 30 and 40, I/O controller 52, and I/O device 54 may all be referred to as bus devices herein. As shown, each processor unit 20, 30 and 4 may include processors 100, 70 and 80 and L1 caches 110, 72 and 82, respectively. The L1 caches may be located on the same chip as the respective processor. Coupled to processors 100, 70 and 80 are L2 caches 120, 74 and 84, respectively. Each L2 cache is connected to the system bus 45 via the processor to which it is attached.

Each L1 and L2 cache pair are normally serially related. The L1 caches may be implemented as store-in or write-through, while the larger and slower L2 cache may be implemented as a write-back cache. Both the L1 and L2 cache controllers are physically implemented as part of the processing unit, and are connected via buses internal to the processing unit. Alternatively, the L2 controller could be off-chip.

FIG. 2 depicts a high level block diagram 200 of a single processing unit in accordance with the present invention. Main memory 60 and L2 cache 120 are connected by system bus 45 to processor 100. Address request logic 205 sends address requests and priority states to L1 cache 110 and other components of processor 100 for each memory access to L1 cache 110. Address requests are sent sequentially to L1 cache 110 and each L1 cache 110 access is determined to be either a "cache hit" or a "cache miss" for the address requested. At the same time, processor 100 uses address guess generation logic 210 to generate speculative pre-fetch addresses that are also sent to L1 cache 110.

In FIG. 2, multiple memory accesses to L1 cache 110 are shown being sent through N+1 pipelines comprised of registers 211–218 and circuitry for performing Hit/Miss Check 0 through Hit/Miss Check N. In a preferred embodiment of the present invention, memory accesses to L1 cache 110 are pipelined through two pipelines. Depending on whether a memory access to L1 cache 110 results in a cache hit or a cache miss, arbitration/priority selection circuitry 115 sends either a "mainline" cache miss or a speculative instruction pre-fetch to holding registers 230 for later relaying to main memory 60.

Address requests to L1 cache 110 are assigned a priority by the present invention as determined by a state field in each address request sent to L1 cache 110. Each instruction fetch address is assigned one of four fields: committed, mainline, mainline pre-fetch and pre-fetch. These states are listed in order from highest priority to lowest priority.

The priority state of an instruction fetch request is "committed" if all possible branches in the pending instruction line being executed by processor 100 have been resolved and the instruction line being fetched is absolutely needed from main store 60 or L2 cache 120.

The priority state of an instruction fetch request is "mainline" if the instruction line is needed to satisfy a guessed branch path. Subsequent resolution of a preceding branch in the pending instruction may later change the "mainline" priority state to "committed" or cancel the instruction fetch. In a preferred embodiment, mainline priority state instruction fetches are sent only to L2 cache 120.

The priority state of an instruction fetch request is "mainline pre-fetch" if the preceding instruction line has not yet been scanned for unresolved branches. A mainline pre-fetch priority state can result from a branch guess or a sequential fetch and, in a preferred embodiment, is sent only to L2 cache 120.

Lastly, the priority state of an instruction fetch request is "pre-fetch" if the instruction fetch is a speculative pre-fetching of the next higher instruction line after the instruction line being fetched from L1 cache 110. This occurs if the next higher instruction line is not in L1 cache 110. In a preferred embodiment, a pre-fetch instruction request is only sent to L2 cache 120.

FIG. 3 is a detailed functional block diagram of processor 100 in accordance with the present invention. Processor 100 fetches lines of instructions from L1 cache 110 for processing. In one embodiment of the present invention, each line in L1 cache comprises 128 bytes of data. The bytes are organized into 32 4-byte words. While processor 100 is processing a pending line of instructions, an address request is issued to fetch another line of instructions from L1 cache 110. The address request is generated using instruction address prediction logic 105, which includes branch resolution logic. Instruction address prediction logic 105 utilizes branch history table (BHT) 104, branch target address cache (BTAC) 102, and branch resolution logic to generate a stream of Effective Addresses (EA's) that are used to fetch instructions from L1 cache 110. BTAC 102 identifies the pending line of instructions and determines whether, during past fetches of that line, there were any taken branches at a particular word, or location, within the line. BHT 104 examines instructions within the pending line and identifies any addresses to which the pending line branched in the previous execution.

Instruction address prediction logic (IAPL) 105 sends the next EA after the pending line of instructions to instruction fetch address register (IFAR) 106. IFAR 106 contains the EA, a Valid bit and a state field. L1 cache 110 may be addressed as either Effective Address Content Addressable Memory (ECAM) or as Real Address Content Addressable Memory (RCAM). The EA field of IFAR 106 is used to fetch the data from L1 cache 110 for the line requested by IAPL 105. The EA field is also translated to a real address in translation circuit 107 and incremented by adder 108 and sent to pipeline 0 register 109. The output of pipeline 0 register 109 is therefore the real address of the instruction line following the EA requested by IAPL 105.

The translated EA is also sent from translation circuit 107 to mainline address output register 118 along with the EA priority state value. The priority states of the mainline address are rank ordered (see item 116) from highest to lowest priority: highest=committed, next=mainline, lowest= mainline pre-fetch. Both the mainline address and the incremented pre-fetch address are sent to an arbitration/priority selection circuit 115.

As the foregoing demonstrates, the present invention uses two pipeline sources to generate L1 cache 110 memory accesses. The mainline address request pipeline sends addresses through IFAR 106, translation circuit 107 and mainline address output register 118. The mainline address request pipeline contains "demand" addresses that result from L1 cache 110 misses. Although two miss requests at a time can be in progress, only one miss request to L2 cache 120 or main memory 60 can be sent out through BIU 140 at a time. Therefore, if there is already a mainline miss outstanding, a subsequent mainline address request will have its priority state set to "mainline pre-fetch". Otherwise, the priority state of the mainline request will be "committed" or "mainline".

The second pipeline is the sequential pre-fetch pipeline. The sequential pre-fetch pipeline comprises adder 108, pipeline 0 register 109 and pipeline 1 register 112, and is used for the speculative pre-fetching of instructions. The real address of Line N+1 in the sequential pre-fetch pipeline is always sequentially after the effective address of Line N in the mainline address request pipeline, as a result of the increment by adder 108. Thus, if the pending line is Line 100, processor 100 may request that Line 101 be fetched (based on BTAC 102 and BHT 104 inputs). The EA for Line 101 is sent into the mainline address request pipeline and the RA for Line 101 will be generated and sent into the sequential pre-fetch pipeline.

The EA in the mainline address request pipeline is checked against the ECAM in L1 cache 110 to determine if Line N is present in L1 cache 110. At the same time, the incremented RA in the sequential pre-fetch pipeline is tested against the RCAM in L1 cache 110 to determine if Line N+1 is present in L1 cache 110. If Line N in the mainline address request pipeline is a "hit" and address N+1 in the sequential pre-fetch pipeline is a "miss" in L1 cache 110, arbitration/ priority selection circuit 115 will select the pre-fetch address to be sent through Bus Interface Unit (BIU) 140 to either L2 cache 120 or main memory 60.

Otherwise, if Line N in mainline request pipeline is a "miss" in L1 cache 110, Line N must be fetched from L2 cache 120 or main memory 60 and arbitration/priority selection 115 will always select the Line N address from the mainline address request pipeline over the Line N+1 address from the sequential pre-fetch pipeline, since the priority state of an address in the mainline address request pipeline is always higher than the priority state of an address in the sequential pre-fetch pipeline. The priority states of the memory accesses are also used downstream by the external memory system to establish priority among multiple memory requests being serviced by the external memory system.

BIU 140 employs two Outstanding Miss Registers, OMR 0 130 and OMR 1 135 to hold addresses from the two pipelines until each request is completed by data returning from external memory or by the request being cancelled. Processor 100 also includes checking circuitry 125, which is used to examine the addresses in the two pipelines. If a memory access in L1 cache 110 results in either an ECAM hit or an RCAM hit, checking circuitry 125 prevents the address request from entering either the mainline address request pipeline or the sequential pre-fetch pipeline.

Checking circuitry 125 also detects the occurrence of repetitive L1 cache 110 misses for the same address line. Checking circuitry 125 prevents subsequent cache misses on Line N from re-entering the pipeline while the first cache miss to Line N is still outstanding. Since the first Line N address request retrieves the needed line from external memory, other Line N address requests in the pipeline would cause a redundant fetching. In this way, checking circuitry 125 prevents the unnecessary consumption of external memory bus bandwidth.

Checking circuitry 125 further ensures that there is no more than one sequential pre-fetch request outstanding to bus 45 at any one time. In this manner, one of the outstanding miss registers, OMR 0 or OMR 1, is always available to service a mainline address request (priority state=1, 2 or 3). In one embodiment of the present invention, main memory 60 is subdivided into logical page blocks, wherein each block may contain, for example, 4096 blocks of data. Checking circuitry 125 examines the lower 12 bits of the address to ensure that a pre-fetch request does not cross a logical page boundary in main memory 60. Lastly, if the priority state of a first memory address request is changed by a subsequent, higher priority request to the same address, such as from "mainline" to "committed", checking circuitry 125 will modify the priority state of the first memory address request to the new value.

Although the present invention and its advantages have been described in detail, it should be understood that various changes, substitutions and alterations can be made herein without departing from the spirit and scope of the invention as defined by the appended claims.

What is claimed is:

1. A processor comprising:

a primary cache memory associated with said processor;

next address circuitry for generating a next instruction cache line address N associated with a pending cache line of instructions being executed by said processor;

pre-fetch address circuitry for generating a pre-fetch instruction cache line address N+1 sequential to said next instruction cache line address N, wherein address N+1 is associated with a next cache line subsequent to cache line N;

first address request circuitry for generating a next address request and accessing said next instruction cache line address N in said primary cache memory;

second address request circuitry for generating a pre-fetch address request and accessing said pre-fetch instruction cache line address N+1 in said primary cache memory; and arbitration circuitry for receiving said next address request and said pre-fetch address request and sending said next address request to a subsequent level memory if said next address request resulted in a cache miss in said primary cache memory and sending said pre-fetch address request to said subsequent level memory if said pre-fetch address request resulted in a cache miss in said primary cache memory, wherein said next address circuitry assigns a first selected one of at least one higher priority state to said next address request, said first selected higher priority state being determined by previous executions of said pending cache line of instructions, and wherein said pre-fetch address circuitry assigns a lowest priority state to said pre-fetch address request.

2. The processor as set forth in claim 1 further comprising checking circuitry for determining if a first pre-fetch address request has been sent to said subsequent level memory and preventing a second pre-fetch address request from being sent to said subsequent level memory while said first pre-fetch address request is outstanding.

3. The processor as set forth in claim 1 further comprising checking circuitry for determining if a first next address request for cache line address X has been sent to said subsequent level memory and preventing a second next address request from said cache line address X from being sent to said subsequent level memory while said first next address request for cache line address X is outstanding.

4. The processor as set forth in claim 1 further comprising checking circuitry for preventing said pre-fetch address request from being sent to said subsequent level memory if said pre-fetch instruction cache line address N+1 and said next instruction cache line address N reside in different logical page blocks in said subsequent level memory.

5. The processor as set forth in claim 1 further comprising checking circuitry for preventing said pre-fetch address request from being sent to said arbitration circuitry if said pre-fetch address request resulted in a cache hit in said primary cache memory.

6. The processor as set forth in claim 1 further comprising checking circuitry for preventing said next address request from being sent to said arbitration circuitry if said next address request resulted in a cache hit in said primary cache memory.

7. The processor as set forth in claim 1 wherein said next instruction cache line address N is determined from one or more instruction branches in said pending cache line of instructions.

8. The processor as set forth in claim 1 wherein said arbitration circuitry compares said first selected higher priority state of said next address request to said lowest priority state of said pre-fetch address request and sends said next address request to subsequent level memory in response to said comparison.

9. The processor as set forth in claim 1 further comprising checking circuitry for changing said lowest priority state of said pre-fetch address request to a selected one of said at least one higher priority states in response to an execution of said pending cache line of instructions.

10. The processor as set forth in claim 1 further comprising checking circuitry for changing said first selected higher priority state of said next address request to a second selected one of said at least one higher priority states in response to an execution of said pending cache line of instructions.

11. A data processing system comprising:
a processor;
a primary cache memory associated with said processor;
a secondary cache memory associated with said processor;
a main memory;
next address circuitry for generating a next instruction cache line address N associated with a pending cache line of instructions being executed by said processor;
pre-fetch address circuitry for generating a pre-fetch instruction cache line address N+1 sequential to said next instruction cache line address N;
first address request circuitry for generating a next address request and accessing said next instruction cache line address N in said primary cache memory;
second address request circuitry for generating a pre-fetch address request and accessing said pre-fetch address cache line address N+1 in said primary cache memory; and
arbitration circuitry for receiving said next address request and said pre-fetch address request and sending said next address request to said secondary cache memory or said main memory if said next address request resulted in a cache miss in said primary memory and sending said pre-fetch address request to said secondary cache memory or said main memory if said pre-fetch address request resulted in a cache miss in said primary cache memory, wherein said first address request circuitry assigns a selected one of at least one higher priority state to said next address request, where said selected higher priority state is determined by previous executions of said pending cache line of instructions, and said second address request circuitry assigns a lowest priority state to said pre-fetch address request.

12. The data processing system as set forth in claim 11 further including checking circuitry for determining if a first pre-fetch address request has been sent to said secondary cache memory or said main memory and preventing a second pre-fetch address request from being sent to said secondary cache memory or said main memory while said first pre-fetch address request is outstanding.

13. The data processing system as set forth in claim 11 further including checking circuitry for determining if a first next address request for cache line address X has been sent to said secondary cache memory or said main memory and preventing a second next address request for said cache line address X from being sent to said secondary cache memory or said main memory while said first next address request for cache line address X is outstanding.

14. The data processing system as set forth in claim 11 further including checking circuitry for preventing said pre-fetch address request from being sent to said secondary cache memory or said main memory if said pre-fetch instruction cache line address N+1 and said next instruction cache line address N reside in different logical blocks in said secondary cache memory or said main memory.

15. The data processing system as set forth in claim 11 further including checking circuitry for preventing said pre-fetch address request from being sent to said arbitration circuitry if said pre-fetch address request resulted in a cache hit in said primary cache memory.

16. The data processing system as set forth in claim 11 further including checking circuitry for preventing said next address request from being sent to said arbitration circuitry if said next address request resulted in a cache hit in said primary cache memory.

17. The data processing system as set forth in claim 11 wherein said next instruction cache line address N is determined from one or more instruction branches in said pending cache line of instructions.

18. The data processing system as set forth in claim 11, wherein said arbitration compares said selected higher priority state of said next address request to said lowest priority state of said pre-fetch address request and sends the next address request to said second cache memory or said main memory in response to said comparison.

19. The data processing system as set forth in claim 11 further comprising checking circuitry for changing said lowest priority state of said pre-fetch address request to a selected one of said at least one higher priority states in response to an execution of said pending cache line of instructions.

20. The data processing system as set forth in claim 11 further comprising checking circuitry for changing said first selected higher priority state of said next address request to a second selected one of said at least one higher priority states in response to an execution of said pending cache line of instructions.

21. In a data processing system comprising a processor, a primary cache memory associated with the processor, a secondary cache memory associated with said processor, and a main memory, a method of fetching cache lines of instructions from the secondary cache memory or the main memory into the primary cache comprising the steps of:

generating a next instruction cache line address N associated with a pending cache line of instructions being executed by the processor;

generating a pre-fetch instruction cache line address N+1 sequential to the next instruction cache line address N;

generating a next address request operable to access the next instruction cache line address N in the primary cache memory;

generating a pre-fetch address request operable to access the pre-fetch instruction cache line address N+1 in the primary cache;

sending the next address request to the secondary cache memory or the main memory if the next address request resulted in a cache miss in the primary cache memory; and sending the pre-fetch address request to the secondary cache memory or the main memory if the pre-fetch address request resulted in a cache miss in the primary cache memory, wherein said step of generating a next address request assigns a selected one of at least one higher priority state to said next address request, where said selected higher priority state is determined by previous executions of said pending cache line of instructions, and said step of generating a pre-fetch address request assigns a lowest priority state to said pre-fetch address request.

22. The method as set forth in claim 21 including the further steps of determining if a first pre-fetch address request has been sent to the secondary cache memory or the main memory and preventing a second pre-fetch address request from being sent to the secondary cache memory or the main memory while the first pre-fetch address request is outstanding.

23. The method as set forth in claim 21 including the further steps of determining if a first next address request for cache line address X has been sent to the secondary cache memory or the main memory and preventing a second next address request for cache line address X from being sent to the secondary cache memory or the main memory while the first next address request for cache line address X is outstanding.

24. The method as set forth in claim 21 including the further steps of preventing the pre-fetch address request from being sent to the secondary cache memory or the main memory if the pre-fetch instruction cache line address N+1 and the next instruction cache line address N reside in different logical blocks in the secondary cache memory or the main memory.

* * * * *